United States Patent [19]

Itoh et al.

[11] Patent Number: 5,362,129
[45] Date of Patent: Nov. 8, 1994

[54] STRUCTURE OF A CASING FOR HEADREST STAY

[75] Inventors: Yoshikazu Itoh; Masami Akiyama, both of Akishima, Japan

[73] Assignee: Tachi-s Co., Ltd., Akishima, Japan

[21] Appl. No.: 953,654

[22] Filed: Sep. 29, 1992

[51] Int. Cl.$^5$ .............................................. A47C 7/36
[52] U.S. Cl. ................... 297/391; 297/452.18
[58] Field of Search .............. 297/391, 396, 410, 452, 297/440, 440.1, 440.2, 452.1, 452.18

[56] References Cited

U.S. PATENT DOCUMENTS

| | | | |
|---|---|---|---|
| 4,688,852 | 8/1987 | Arai et al. | 297/410 |
| 5,000,283 | 3/1991 | Krieg | 297/379 X |
| 5,131,720 | 7/1992 | Nemoto | 297/391 X |

Primary Examiner—Peter R. Brown
Assistant Examiner—Milton Nelson, Jr.
Attorney, Agent, or Firm—Oldham, Oldham & Wilson, Co., Ltd.

[57] ABSTRACT

A structure of a casing for covering a stay of a cantilever-type headrest, in which the headrest is supported via the stay on a seat back of an automotive seat in a cantilever way, and the casing, which covers the stay, has a flat abutment surface formed at the upper end thereof which is abutted against one lateral wall of the headrest body, the flat abutment surface being formed with a cut-away portion for defining an opening therein. Hence, a region of such one lateral wall of headrest body, against which is abutted the flat abutment surface of the casing, is upheaved within the opening, so as to create plural undesired wrinkles only at that region and thus interiorly of the casing, which prevents the wrinkles from appearing on the outer surface of headrest body around the casing.

5 Claims, 3 Drawing Sheets

STRUCTURE OF A CASING FOR HEADREST STAY

BACKGROUND OF INVENTION

1. Field of the Invention

The present invention relates to a casing provided on an automotive seat for covering a stay of a cantilever type headrest, and in particular to a molded plastic casing for covering such cantilever-type headrest stay mounted on a seat back of the automotive seat.

2. Description of Prior Art

As shown in FIG. 1, there has been known a cantilever-type headrest (HR) which is supported by only one headrest stay (4) upon a seat back (SB) of an automotive seat in a cantilever way.

Reference being made to FIGS. 1 through 4, a structure of this particular headrest (HR) is based on a framework comprising a headrest frame (8), a seat back frame (6) and the headrest stay (4), wherein the upper horizontal section of the stay (4) is fixed to the headrest frame (8) by welding, while the lower vertical section of the same is firmly supported by a bracket (5) fixed fast upon one upper corner of the seat back frame (6).

The headrest frame (8) is upholstered with a top cover member (3) and a foam cushion member (7) to form the headrest (HR), as can be seen from FIG. 3.

As best shown in FIG. 1 and 4, the seat back (SB) is provided with a back board (B). Though not shown, the seat back (SB) per se is formed by a top cover member and a foam cushion member, likewise as in the headrest (HR), which are upholstered around the seat back frame (6).

In the present cantilever-type headrest structure, what ought to be exposed is the lower vertical section of headrest stay (4) and bracket (5), and in order to cover those portions, there is provided a casing which is formed by a frontal casing portion (2) and a rearward casing portion (1). While the frontal casing portion (2) is separately formed, the rearward casing portion (1) is formed integrally with the back board (B). Those two casing portions (1)(2) and back board (B) are all formed from a hard synthetic resin material.

As shown, each of those two casing portions (1) (2) is of a channel configuration in section, and they are fixed together at a juncture line (l). In particular, the frontal casing portion (2) is formed with a flat abutment surface (211) at the upper end thereof, and also the rearward casing portion (1) is formed with a flat abutment surface (111) at the upper end thereof. Those two abutment surfaces (211) (111) provide a vertical flat surface to be abutted against one lateral wall of the headrest (HR). A hole (100) is formed between the two abutment surfaces (111) (211), and through such hole (100), there passes the upper horizontal section of the headrest stay (4).

Designation (41) denotes a securing bolt, by means of which, the lower end of the stay (4) is secured firmly to the bracket (5).

However, since the abutment surfaces (111)(211) of casing portions stated above are pressed a certain amount against the one lateral wall of headrest (HR), as indicated at (31) in FIG. 3, to achieve a close contact therebetween, a plurality of objectionable wrinkles (a) are created at the corresponding area of headrest top cover member (3), against which are thus abutted the casing abutment surfaces (111)(211), such that the wrinkles (a) develops around and radially from the periphery of casing (1, 2), as seen from FIG. 2. This impairs the aesthetic appearance of headrest (HR).

Further, as can be seen in FIG. 4, a spacing is provided between the bracket (5) and the inner walls of casing (1, 2) as well as between the stay (4) and the same casing inner walls. As the casing (1, 2) is formed in this way for the reason of errors in design or another specification requirements, the vibrations, or rolling and pitching, of an automobile during its running, causes the inner wall of the casing (1, 2) to be repeatedly contacted with those bracket (5) and stay (4), thus emitting an unpleasant noise.

Moreover, it is difficult to precisely meet together the mating edges of both frontal and rearward cover portions or halves (1)(2) at the juncture line (l), which makes it slow and difficult to assemble headrest and seat.

SUMMARY OF THE INVENTION

In view of the above-stated drawbacks, it is a purpose of the present invention to provide an improved structure of a casing for covering a stay of a cantilever-type headrest, which avoids creation of the above-described objectionable wrinkles between one lateral wall of the headrest body and upper end of the casing.

In order to attain such purpose, in accordance with the present invention, there is basically provided a structure of casing for the headrest stay comprising:

- a flat abutment surface defined at an end portion of the casing which is abutted against one lateral wall of the headrest body; and
- a cut-away portion formed in the flat abutment surface,
- wherein, through said cut-away portion, an opening is defined at the flat abutment surface of the casing, so that a region of said one lateral wall of headrest body, against which is abutted the flat abutment surface, is upheaved within such opening so as to create plural undesired wrinkles only at that region and thus interiorly of said casing.

In one aspect of the invention, the casing comprises a frontal casing portion and a rearward casing portion, and each of those two casing portions is formed at its end with the foregoing flat abutment surface and cut-away portion, whereupon, with the two casing portions jointed together, both cut-away portions of them cooperate with each other to define the foregoing opening.

The rearward casing portion may be formed integrally with a back board which is attached over the reverse side of the seat back.

Preferably, the casing or those two casing portions should be formed from a hard synthetic resin material.

In another aspect of the invention, the lower end of the headrest stay is fixed via a bracket to a seat back frame provided in the seat back, and the above-noted frontal and rearward casing portions are designed to cover both bracket and headrest stay, such that the rearward casing portion is provided with a rib means which contacts at least one side of the bracket. The rib means includes a projected part which is projected outwardly, and this projected part serves as a guide for allowing the frontal casing portion to be easily and precisely jointed with the rearward casing portion, when jointing the frontal casing portion to the rearward one. Moreover, by means of such rib means, both frontal and rearward casing portions are retained against contact with the bracket and headrest stay. Accordingly, it is possible to suppress any contact noise between them.

BRIEF DESCRIPTION OF THE DRAWINGS

FIG. 9, 10 and 11 relates to another embodiment of the invention; wherein

FIG. 9 is a schematic perspective view showing a principal portion of such another embodiment;

FIG. 10 is a schematic, exploded, perspective view which substantially shows the same principal portion as in FIG. 9; and FIG. 11 is a sectional view taken along the line XI—XI in FIG. 5 in connection with such another embodiment of the invention.

DETAILED DESCRIPTION OF PREFERRED EMBODIMENTS OF THE INVENTION

First of all, it should be understood that the present invention is directed to an improvement of the previously described prior-art headrest structure of cantilever type, using most of their elements, and therefore all like designations in the prior art description above correspond to all like designations to be given in this description hereinafter, and that with regard to the common parts and elements, any explanation is deleted for the sake of simplicity.

Figure 1:
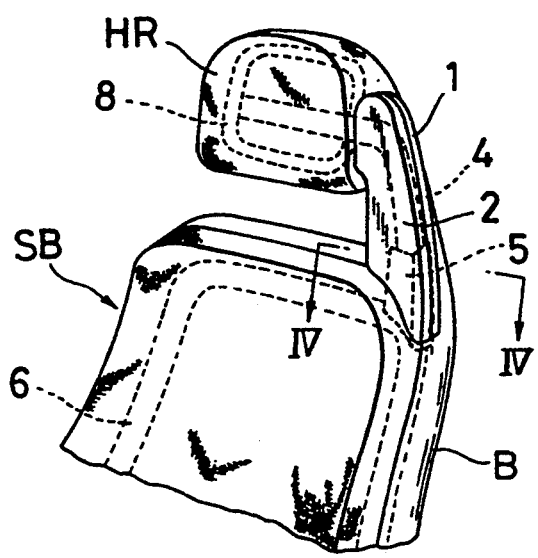
FIG. 1 is a partly broken perspective view of an automotive seat provided with a conventional cantilever-type headrest.
Figure 2:
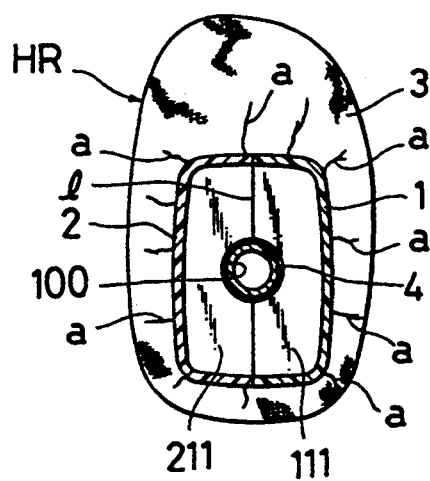
FIG. 2 is a schematic diagram which explanatorily shows a spot where the upper end of stay casing is abutted against one lateral wall of the headrest, and points out the creation of wrinkles there.
Figure 3:
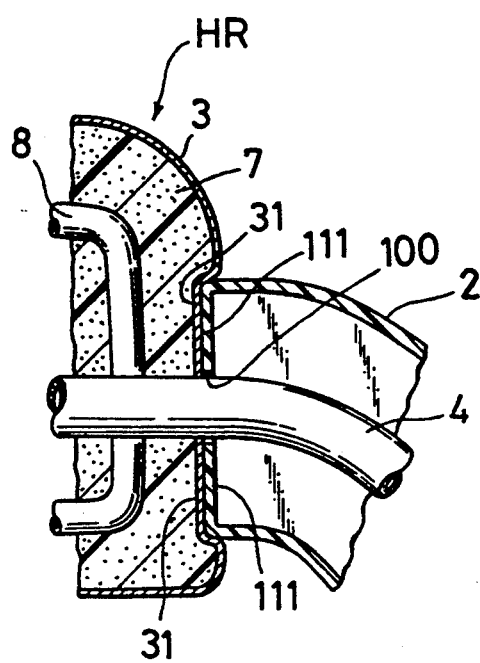
FIG. 3 is a schematic, longitudinally sectional view of the spot shown in FIG. 2.
Figure 4:
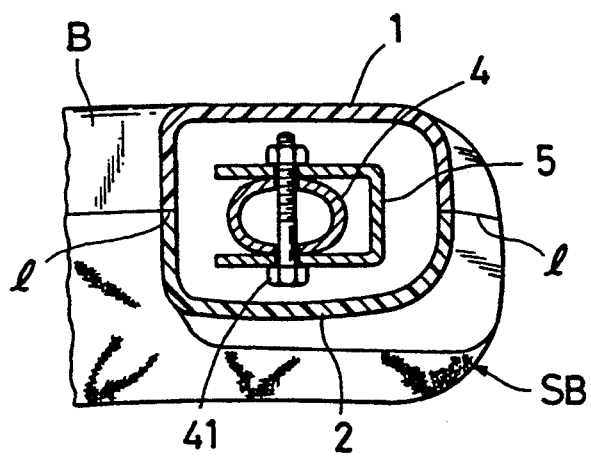
FIG. 4 is a sectional view taken along the line IV—IV in FIG. 1.
Figure 5:
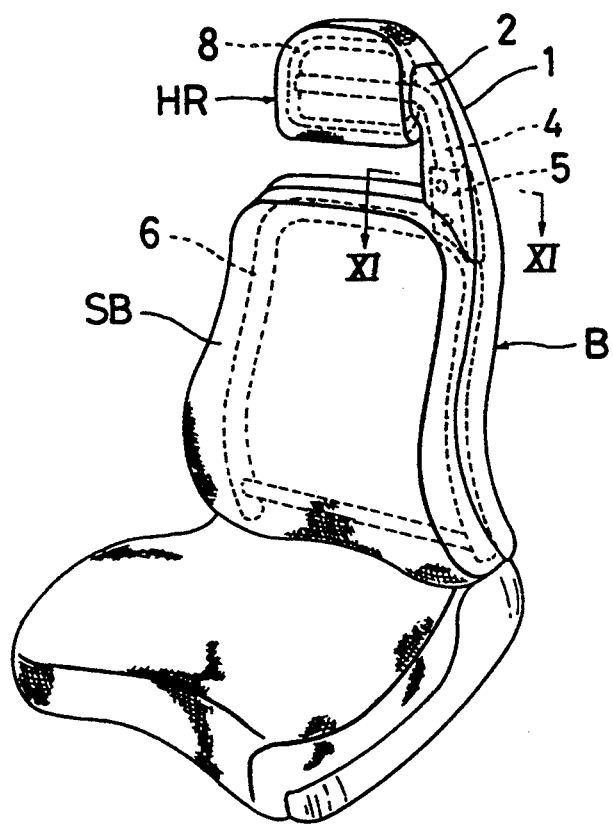
FIG. 5 is a perspective view of an automotive seat with a cantilever-type headrest structure in accordance with the present invention.
Figure 6:
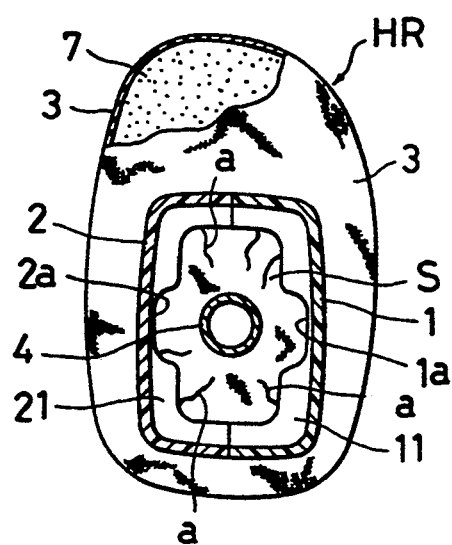
FIG. 6 is a schematic diagram which explanatorily shows a spot where the upper end of stay casing is abutted against one lateral wall of headrest, and further shows the wrinkles to be absorbed within the casing, in accordance with the invention.
Figure 7:
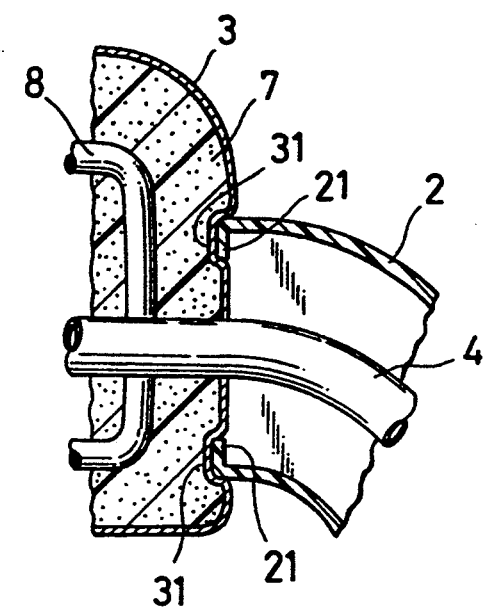
FIG. 7 is a schematic, longitudinally sectional view of the spot shown in FIG. 6.
Figure 8:
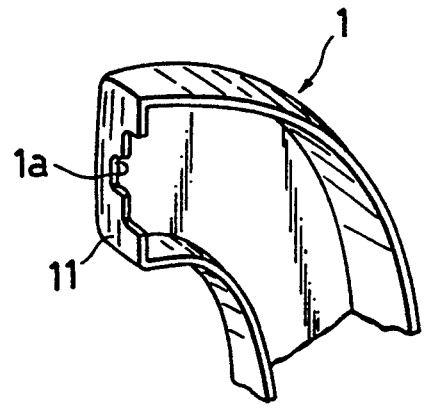
FIG. 8 is a partly broken perspective view of a rearward casing portion.

Referring now to FIGS. 5 through 8, there is shown a first embodiment of headrest structure in accordance with the present invention. Considering the tendency for the wrinkles (a) to expand radially from the periphery of the headrest stay casing (1, 2) as found in the prior art, we, the inventors, admit that a flat large area of contact given from the foregoing abutment surfaces (111)(211) of prior-art casing (1, 2), when it is pressed into the particular spot (31) in the elastic headrest body (HR), causes a uniform depression by the corresponding area therein, which inevitably draws or pulls the surrounding top cover member (3) towards the center of the casing (1, 2). Thus, taking this factor into account, as best shown in FIGS. 6 and 8, the frontal and rearward casing portions (2)(1) in accordance with the present invention are provided with cut-away parts (2a)(1a) to define an opening (S) at the abutment surface.

Stated otherwise, the upper end of the frontal casing portion (2) is formed with a cut-away part (2a) of "⌐⌐" shaped configuration, by cutting accordingly, its abutment surface which corresponds to that (211) of the prior-art frontal casing portion (2), whereupon there is defined a small abutment surface (21), the area of which is greatly reduced. Also, the upper end of the rearward casing portion (1) is formed with a cut-away part (1a) by cutting its abutment surface which corresponds to that (111) of the prior-art rearward casing portion (1), in the same shape with that of the foregoing one (1a), whereupon a small abutment surface (11) is defined, the area of which is greatly reduced. It is noted here that the shapes of both cut-away portions (1a)(2a) are not limited to the illustrated ones, and may be altered to another shape insofar as it can give as much large cut-away area as possible thereto.

Accordingly, when fixing together the above-constructed two casing portions (1)(2), an opening (S) is defined between the above-stated two cut-away portions (1a)(2a), as shown in FIG. 6. It is then appreciated that both abutment surfaces (11)(21) are reduced greatly in area, while at the same time, a large opening (S) is defined therein, so that, after having assembled such stay casing (1, 2) with the lateral wall of headrest body (HR), the objectionable wrinkles (a) in question are then created in the region of headrest top cover member (3) which is circumscribed by that opening (S), thereby absorbing the wrinkles (a) into the inside of the casing (1, 2). Thus, any of the wrinkles are not viewed from the outside, and the outer appearance of headrest (HR) is maintained aesthetically. The reason is that (i) the reduction of area in the abutment surface (11, 21) makes lower the depression of the outer surface of headrest (HR), and (ii) the large opening (S) allows escape therethrough of the pressure exerted by the casing (1, 2) upon the headrest body (HR), with the result that the region of the headrest body (HR) circumscribed by the opening (S) is upheaved towards the inside of casing (1, 2), which causes the wrinkles (a) to create and expand in that particular headrest region, interiorly of the casing (1, 2), as shown in FIGS. 6 and 7.

Figure 9:
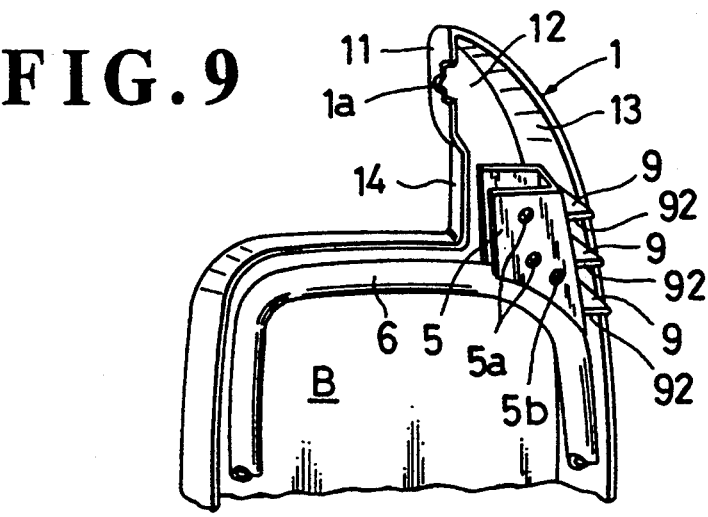
Figure 10:
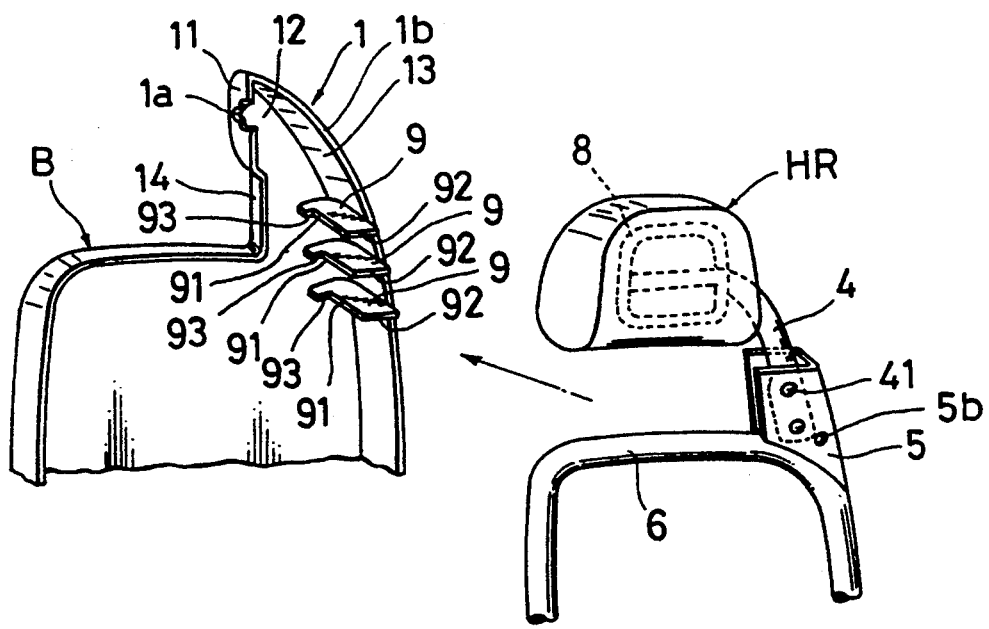
Figure 11:
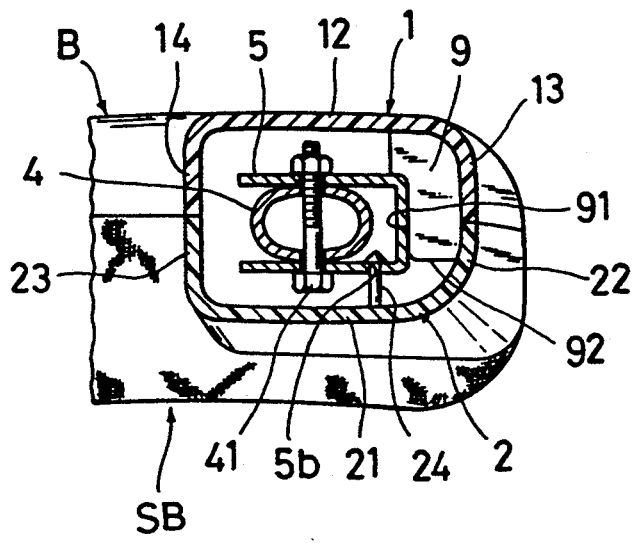

Referring to FIGS. 9 through 11, there is shown a second embodiment of the present invention, wherein there are formed three ribs (9) within the rearward casing portion (1) formed in the first embodiment above.

Specifically, as viewed from FIG. 10, each of ribs (9) is a plate-like rib which is integrally formed at the inner wall of the rearward casing portion (1), such that the rib (9) projects from the inward surfaces respectively of the central flat wall section (12) and the right-side lateral wall section (13), of the rearward casing portion (1). The three ribs (9) are disposed in parallel with one another and situated at a location corresponding to the bracket (5). The configuration of each of those ribs (9) is such that a free edge (92), an abutment edge (91) and a stepped abutment edge (93) are defined therein. On the other hand, the frontal casing portion (2) has, formed at its inner wall, a headed securing pin (24), integrally, which projects for insertion and resilient securement in a securing hole (5b) formed in the bracket (5). It is noted that each of the ribs (9) projects its forward end portion corresponding to the free edge (92) and a part of the abutment edge (91); namely, in FIG. 10, such forward end portion of rib (9) is shown to be projected beyond the juncture edge (1b) of rearward casing portion (1), for a purpose to be explained later.

With this structure, firstly, the seat back frame (6) with the headrest (HR), headrest stay (4) and bracket (5) provided thereon are bodily placed in the back board (B) and integral rearward casing portion (1), as indicated by the arrow in FIG. 10. Then, with particular reference to FIG. 9, it is observed that the bracket (5) is slidingly guided by the abutment edges (91) of the three ribs (9) and abutted against the stepped abutment edges (93) thereof (see FIG. 11), so that the bracket (5) is retained by those three ribs (9). Secondly, the top cover member and cushion member associated with the seat back (SB) are securely coupled to the back board (B), to thereby form the seat back (SB). Finally, the frontal casing portion (2) is secured to the rearward casing portion (1), whereupon a stay casing is thereby formed, covering both bracket (5) and lower vertical section of headrest stay (4). At this point, the frontal casing portion (2) is first guided by the foregoing projected forward end portions of three ribs (9), so that both matable edges of the frontal and rearward casing portions (2)(1) are precisely met and contacted together along the juncture line (l). At the same time, the conical head of the securing pin (24) is elastically inserted in and anchored at the hole (5b) of the bracket (5). Preferably, the pin (24) is made of a synthetic resin material with a certain elastic nature.

Accordingly, in the present second embodiment, the frontal casing portion (2) can be easily and precisely secured to the rearward casing portion (1), by virtue of the ribs (9) and pin (24). Further, the stay casing (1, 2) is retained by those two elements (9)(24) against movement, whereby no contact is made between the casing (1, 2) and the elements (9, 24) so as to suppress noise therefrom.

While having described the present invention as above, it should be understood that the invention is not limited to the illustrated embodiment, but any other replacements, modifications and additions may be applied thereto structurally without departing from the scope of the appended claims,

What is claimed is:

1. A structure of a casing covering a headrest stay in a headrest, in which said headrest includes a headrest body upholstered with a top cover member, said headrest body being cantilevered upon an automotive seat back of an automotive seat by means of said headrest stay wherein, said casing covers said headrest stay in an enclosing manner, said structure comprising a flat abutment surface defined at an end portion of said casing, which is abutted against one lateral wall of said headrest body; and a cut-away portion which is so formed in said flat abutment surface so as to define an enlarged opening between said cut-away portion and a periphery of said headrest stay, the dimensions of said opening being enlarged to allow a substantial part of said top cover member of said headrest body to be drawn into the inside of said casing, thereby causing undesired wrinkles in said top cover member to be created only interiorly of said casing and avoiding creation of said undesired wrinkles at an outer surface of said top cover member surrounding said flat abutment surface of said casing;

said casing comprises a frontal casing portion and a rearward casing portion;

wherein said seat back has a seatback frame provided therein, and a bracket is fixed on said seatback frame;

both said frontal and rearward casing portions being so formed as to cover said headrest stay and bracket;

wherein said rearward casing portion is provided with at least one rib means which contacts at least one side of said bracket, said rib means including a projected part which is projected outwardly from said rearward casing portion; and wherein when joining said frontal casing portion to said rearward casing portion, said projected part of said rib means serves as a guide for allowing said frontal casing portion to be easily and precisely joined with said rearward casing portion, and further, both said frontal and rearward casing portions are retained by said rib means against contact with said bracket and headrest stay.

2. The structure as defined in claim 1 wherein the casing is generally cylindrical in form.

3. The structure as defined in claim 2, wherein said seat back includes a back board attached to a reverse side thereof, and wherein said rearward casing portion is formed integrally with said back board.

4. The structure as defined in claim 1, wherein said casing is formed from a hard synthetic resin material.

5. The structure as defined in claim 2, wherein said frontal and rearward casing portions are formed from a hard synthetic resin material.

* * * * *